United States Patent Office 3,336,289
Patented Aug. 15, 1967

3,336,289
9-β-D-RIBOFURANOSYL-7-DEAZAPURINE
5'-PHOSPHATE ESTERS
William J. Wechter and Arthur R. Hanze, Kalamazoo, Mich., assignors to The Upjohn Company, Kalamazoo, Mich., a corporation of Delaware
No Drawing. Filed Sept. 20, 1965, Ser. No. 488,779
9 Claims. (Cl. 260—211.5)

The present invention is concerned with novel compounds and, more particularly, with novel alkyl, cycloalkyl and aryl esters of 9-β-D-ribofuranosyl-7-deazapurine 5'-phosphates, intermediates thereto and a process of production thereof.

The novel compounds and the generic process of production thereof can be illustratively represented by the following formulae:

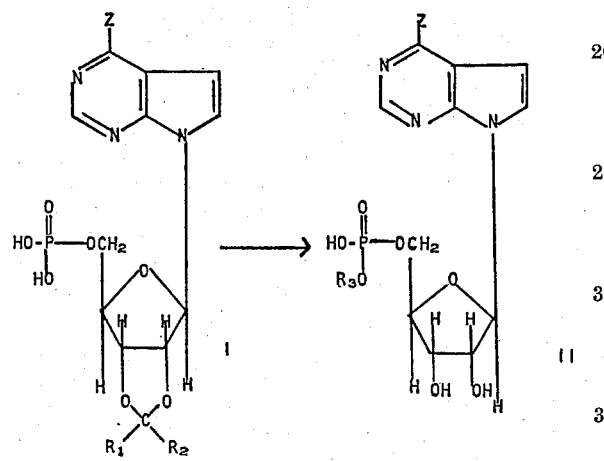

wherein $R_1$ and $R_2$ are alkyl radicals having from 1 to 4 carbon atoms, inclusive, or together can form an alkylene chain of 4 to 6 carbon atoms, inclusive; wherein Z is selected from the group consisting of hydrogen, hydroxy, amino, acylamino, in which the acyl group is of a hydrocarbon carboxylic acid containing from 2 to 12 carbon atoms, inclusive, and anisoyl, thio, and alkylthio in which the alkyl is defined as above, and wherein $R_3$ is selected from the group consisting of alkyl radicals having from 1 to 12 carbon atoms, inclusive, cycloalkyl having from 5 to 10 carbon atoms, inclusive, and aryl having from 6 to 12 carbon atoms, inclusive.

Alkyl groups having from 1 to 12 carbon atoms, inclusive, as herein used, include, illustratively, methyl, ethyl, propyl, isopropyl, butyl, isobutyl, pentyl, hexyl, heptyl, octyl, nonyl, decyl, undecyl, dodecyl, and the like.

Cycoalkyl as herein used include cyclopentyl, cyclohexyl, methylcyclopentyl, cycloheptyl, dimethylcyclohexyl, cyclooctyl, cyclodecyl and the like.

Aryl groups containing from 6 to 12 carbon atoms, inclusive, as herein used, include, illustratively, phenyl, alkyl-substituted phenyls, e.g., methyl, ethyl, propyl, butyl-phenyls, α-naphthyl, β-naphthyl, and alkylsubstituted naphthyls, e.g., methyl-, dimethyl-, ethyl-, diethyl-substituted naphthyls, nitro-substituted phenyls, e.g., p-nitrophenyl, 2,4 - dinitrophenyl; nitro - substituted naphthyl groups, e.g., 2-nitronaphthyl, and the like.

The process of the present invention includes: treating a 9 - (2',3' - O - isopropylidene - β - D - ribofuranosyl)-7-deazapurine 5'-phosphate (I) under anhydrous conditions with a reagent selected from alkanol; having from 1 to 12 carbon atoms, inclusive, cycloalkanols having from 5 to 10 carbon atoms, inclusive, phenols and naphthol, having from 6 to 12 carbon atoms, inclusive, in the presence of a strong organic basic agent such as a trialkylamine and a condensing agent, e.g. dicyclohexylcarbodiimide to give the corresponding alkyl, cycloalkyl or aryl ester of 9-(2',3'-O-isopropylidene-β-D-ribofuranosyl)-7-deazapurine 5'-phosphate, which is then treated with an acid to give the alkyl, cycloalkyl or aryl ester of 9-β-D-ribofuranosyl-7-deazapurine 5'-phosphate. (II) If the group Z is an acylamino group a base hydrolysis may precede or follow the acid hydrolysis to obtain a compound II with a free amino group.

The novel alkyl, cycloalkyl and aryl esters of 9-β-D-ribofuranosyl-7-deazapurine - 5' - phosphate (II) exhibit significant cytotoxic activity in vitro, particularly against the different types of Herpes, Coe, and vaccinia viruses. For this reason the products can be employed for cleaning glassware and instruments, used in the growing of tissue cultures in virus and tumor research, washing excised tumor tissue, intended for transplant into animals, to inhibit the growth of any KB tumor cells that might otherwise seed surrounding tissues or be transported to other parts of the animal body. The antiviral activity can also be used to prepare cultures of microorganisms free of viral phages, e.g., phage-free, antibiotic-producing Streptomyces cultures. The compounds moreover differ from the unesterified phosphates by being retained in the blood serum, and not in the blood cells. This property is highly desirable from a toxicity stand point of view. Methyl 9-β-D-ribofuranosyl-7-deazaadenine 5'-phosphate is also active against certain fungi, such as penicillium, oxalicum.

The starting materials of Formula I are prepared as shown in the Preparations.

In carrying out the process of the present invention a selected starting material of Formula I in an appropriate solvent selected from the group of solvents consisting of pyridines, picolines, lutidines, ethylpyridines, and the like is reacted, under completely anhydrous conditions, in the presence of a condensing agent such as a dialkylcarbodiimide, dicycloalkylcarbodiimide, or the like with a selected alkanol, phenol or naphthol. All reagents must be completely dry, which is generally achieved by concentrating a solution of the starting material, a 9-(2',3'-O-isopropylidene-β-D-ribofuranosyl)-7-deazapurine-5'-yl phosphate, in the selected solvent, preferably pyridine under reduced pressure. This procedure is usually carried out several times prior to adding the anhydrous alkanol or phenol and the anhydrous trialkylamine and condensing agent. The alkanol or phenol which is used to produce the ester of Formula II, is generally given in a large excess such as in 10 to 50 times the required molar equivalent. The organic base, a trialkylamine, is given in a quantity between one to five times molar equivalent and the condensing agent in a quantity of 1 to 30 times molar equivalent. The amounts are not critical and larger or smaller amounts can be used.

The reaction period is generally between 4 hours and about 4 days. At the termination of the reaction, the product, an alkyl or aryl 9-(2',3'-O-isopropylidene-β-D-ribofuranosyl)-7-deazapurine-5'-phosphate is recovered by conventional methods such as by washing the solution with ether and decanting the ether, treating the remainder with water to destroy the carbodiimide (giving a substituted urea, which is removable by filtration) and concentrating the solution. The concentrated solution is hydrolyzed to eliminate the isopropylidene moiety. The hydrolysis is carried out with a mineral organic acid, preferably with 80% aqueous acetic acid. If an acylamino group is to be eliminated, a base hydrolysis is necessary, preferably the base hydrolysis is carried out with concentrated ammonium hydroxide in a lower alkanol such as methanol, ethanol, propanol, isopropanol and the like, at a low temperature, but for a long duration, e.g., at about room temperature (20 to 28° C.) and during a period of 10 to 30 hours. In this manner the desired product is obtained without hydrolysis of the ester moiety of the ribofuranosyl-7-deazapurine alkyl or aryl phosphate esters. After the hydrolyses are completed, the product is isolated in conventional manner such as by crystallization, chromatography, extraction, electrophoresis and the like. The following preparations and examples are illustrative of the product and processes of the present invention, but are not to be construed as limiting.

PREPARATION 1

$N^6$-benzoyl-9-(2',3-O-isopropylidene - β - D - ribofuranosyl)-7-deazaadenine [or $N^6$-benzoyl-9-(2',3'-O-isopropylidene-β-D-ribofuranosyl)-6-amino-7-deazapurine; or $N^6$ - benzoyl - 2',3' - O - isopropylidene sparsomycin A; or $N^6$-benzoyl-2',3'-O-isopropylidenetubercidin]

A. PRODUCTION OF SPARSOMYCIN A (TUBERCIDIN) BY FERMENTATION

A soil slant of *Streptomyces sparsogenes* var. *sparsogenes*, NRRL 2940, was used to inoculate a series of 500-ml. Erlenmeyer flasks each containing 100 ml. of seed medium consisting of the following ingredients:

Glucose monohydrate _____ g-- 25
Pharmamedia [1] _____ g-- 25
Tap water q.s. _____ l-- 1

[1] Pharmamedia is an industrial grade of cottonseed flour produced by Traders Oil Mill Co., Fort Worth, Tex.

The seed medium presterilization pH was 7.2. The seed was grown for two days at 28° C. on a Gump rotary shaker operating at 250 r.p.m.

One shake flask of the seed described above (100 ml.) was used to inoculate a 20 liter seed tank containing 15 l. of the above sterile seed medium (S–1) plus 1 ml./l. of lard oil. The seed tank was grown for 24 hours at a temperature of 28° C., aeration rate of 10 standard l./min., and agitated at a rate of 400 r.p.m.

The seed tank, described above, was then used to inoculate a 380-l. fermentor containing 250 l. of the following sterile medium:

Glucose monohydrate _____ g./l-- 10
Dextrin _____ g./l-- 15
Pharmamedia _____ g./l-- 20
Wilson's Peptone Liquor No. 159 [1] _____ g./l-- 5
Lard oil _____ ml./l-- 2
Tap water _____ Balance

[1] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard l./minute, and agitation at 28 r.p.m. During the course of the fermentation, 1850 ml. of lard oil was added as an antifoam.

B. RECOVERY OF SPARSOMYCIN A

The whole beer from the above fermentation was adjusted from the harvested pH of 7.1 to pH 2.4 with 350 ml. of sulfuric acid (concentrated) and filtered using 3.6% diatomaceous earth as filter aid. The filter cake was washed with 0.2 volume of deionized water, the clear beer plus wash (vol. 280 l.) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred for 1 hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 l.) was adjusted to pH 6.4 with 30 ml. of 50% aqueous sodium hydroxide and concentrated to an aqueous solution (40 l.). The concentrate was adjusted to pH 5.9 and freeze-dried to give 447 g. of lyophilized material.

An additional 1126 g. was obtained by twice repeating the above fermentation and recovery. The combined lyophilized material (1573 g.) was slurried in 10 l. of methanol at 40° C. for 1 hour. Insoluble material was filtered off and washed 3 times with 500 ml. of warm methanol (40° C.). The methanol extracts and washes were combined (11.5 l.) and concentrated in vacuo to a dry preparation weighing 321 g. (HRV–25.3) and assaying 1.25 *Proteus vulgaris* biounits/mg.

C. PURIFICATION OF SPARSOMYCIN A

*Partition column.*—300 g. of the above preparation (HRV–25.3) was placed in a partition column which was prepared and developed in the following manner. A solvent system was made using equal volumes (350 l.) of McIlvaine's pH 6.0 buffer and methyl ethyl ketone. A slurry containing 9.6 kg. of diatomite in 60 l. of upper phase and 4.8 l. of lower phase of the above-described solvent system was poured into a 12" column and packed with 4 p.s.i.g. of nitrogen. The column feed was dissolved in 3 l. of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. 4-l. fractions were collected except at the beginning and end of the column when 20-l. fractions were collected. The fractions were concentrated and bio-activities observed on *P. vulgaris* trays. At this point in the process the separation of sparsomycin and sparsomycin A was effectuated. Further processing purified these components and ultimately resulted in crystalline material.

Fractions 24–34, inclusive, from the above partition column contained the sparsomycin (9-β-D-ribofuranosyl-7-deazaadenine) component.

*Purification of sparsomycin A.*—The sparsomycin A component was purified and crystallized in the following manner. Fractions 11–20, inclusive, from the previously described partition column—part C—contained the sparsomycin A component. These fractions were pooled and concentrated under reduced pressure and 7.2 g. of crystalline material was isolated. These crystals were dissolved in 40 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 g. of preparation ADA–102.1. 2 g. of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 g. of preparation ADA–105.1 having a melting point of 247.8–250° C., an optical rotation $[\alpha]_D^{25}$ −62° (c.=0.718 in 0.1 N HCl), an equivalent weight of 269, pKa' of 5.07 in water, an ultraviolet absorption spectrum in Water _____ 270 mμ, a=44.14.
0.01 N H₂SO₄ _____ 227 mμ, a=85,28,
                                 271 mμ, a=40.82.
0.01 N KOH _____ 270 mμ, a=43.50.

a characteristic IR absorption at the following frequencies expressed in reciprocal centimeters:

| | |
|---|---|
| 3350 (S) | 1160 (W) |
| 3250 (S) | 1134 (M) |
| 3145 (S) | 1120 (M) |
| 3095 (S) (sh) | 1093 (M) |
| 2880 (S) (oil) | 1080 (W) |
| 2810 (S) (oil) | 1055 (M) |
| 1895 (W) | 1042 (S) |
| 1640 (M) | 1017 (S) |
| 1592 (S) | 992 (S) |
| 1553 (M) | 953 (W) |
| 1502 (M) | 912 (W) |
| 1475 (M) | 903 (M) |
| 1458 (S) (oil) | 867 (M) |
| 1445 (M) (sh) | 852 (W) |
| 1426 (M) | 842 (W) |
| 1370 (M) (oil) | 799 (W) |
| 1351 (M) | 715 (W) |
| 1306 (M) | 704 (S) |
| 1276 (W) | 675 (M) |
| 1255 (S) | 658 (M) |
| 1241 (M) | |
| 1198 (W) | | and the following elemental analysis:

*Analysis.*—Calcd. for $C_{11}H_{14}N_4O_4$: C, 49.62; H, 5.30; N, 21.04. Found: C, 49.81; H, 5.20; N, 20.92.

9 - β - D - ribofuranosyl - 7 - deazaadenine (sparsomycin A) was also isolated and purified from fermentation broth in another manner. The fermentation was carried on as described above under A. The whole beer (AJW–63) was adjusted to pH 2.5 with 365 ml. of concentrated sulfuric acid and filtered using 6% diatomaceous earth as filter aid. The filter cake was washed with 0.1 volume of deionized water and the wash added to the clear beer. The clear beer was then adjusted to pH 8.0 with 400 ml. of 50% aqueous sodium hydroxide and stirred 1 hour with 1% decolorizing carbon and 3% diatomite. The mixture was filtered and the carbon cake washed with 0.1 volume of deionized water followed by 0.2 volume of 20% aqueous acetone. The washed carbon was eluted twice with 0.4 volume of 40% aqueous acetone which had been acidified to pH 2.5 with concentrated sulfuric acid, and the eluates were pooled. The pooled acetone eluates were then adjusted to pH 4.8 with 53 ml. of 50% aqueous sodium hydroxide, concentrated to an aqueous solution and freeze-dried to yield 284 g. of preparation WMH–32.6 assaying 9KB μ./mg. in tissue culture. 100 g. of this preparation was then dissolved in 600 ml. of methanol and 4 volumes of ether added to precipitate the inactive material. From the methanolether supernatant 2 crops of crystalline material were isolated by allowing the solvent to evaporate slowly. These preparations were pooled and redissolved in 35 ml. of water and 5 ml. of 0.1 N hydrochloric acid. The solution was then filtered and adjusted to pH 9.4 with 50% aqueous sodium hydroxide. The sparsomycin A which separated in crystalline form was collected, washed with water, and dried to give 480 mg. of preparation ADA–104.1 having a melting point of 247.8–250.8° C., an optical rotation $[\alpha]_D^{25}$ —61° (c.=0.908 in 0.1 N HCl), an equivalent weight of 270, pKa' of 5.05 in water, and ultraviolet absorption spectrum in Water _____ 269.5 mμ, a=44.27.
0.01 N H₂SO₄ _____ 227 mμ, a=86.06,
                                 271 mμ, a=41.35.
0.01 N KOH _____ 270 mμ, a=43.61.

a characteristic IR absorption at the following frequencies expressed in reciprocal centimeters:

| | |
|---|---|
| 3400 (S) | 1370 (M) (oil) |
| 3310 (S) | 1355 (S) |
| 3240 (S) | 1342 (M) |
| 3220 (S) | 1310 (S) |
| 3140 (S) | 1285 (M) |
| 2950 (S) (oil) | 1280 (M) |
| 2920 (S) (oil) | 1260 (S) |
| 2850 (S) (oil) | 1245 (S) |
| 2620 (M) | 1200 (M) |
| 1910 (W) | 1164 (M) |
| 1650 (S) | 1137 (S) |
| 1645 (S) | 1125 (M) |
| 1600 (S) | 1092 (S) |
| 1526 (S) | 1084 (M) |
| 1510 (M) | 1057 (M) |
| 1480 (S) | 1045 (S) |
| 1462 (S) (oil) | 1020 (S) |
| 1425 (S) | 995 (S) |
| 955 (M) | 843 (W) |
| 912 (M) | 800 (M) |
| 905 (M) | 715 (S) |
| 870 (S) | 702 (S) |
| 852 (W) | | and the following elemental analysis:

*Analysis.*—Calcd. for $C_{11}H_{14}N_4O_4$: C, 49.62; H, 5.30; N, 21.04. Found: C, 49.62; H, 5.04; N, 20.81.

The characteristics of sparsomycin A, described above, are in good agreement with those reported in the literature for tubercidin. See Anzai, K,; G. Nakamura and S. Suzuki; A new antibiotic, tubercidin. J. Antibiotics, Ser. A, pp. 201–204, September 1957. However, no process whereby tubercidin can be produced is disclosed.

D. 9 - (2',3'-O-ISOPROPYLIDENE-β-D-RIBOFURANOSYL)-7 - DEAZAADENINE ; 2',3'-O-ISOPROPYLIDENESPARSOMYCIN A

A mixture of 1 g. of sparsomycin A which had been dried overnight at 108° C. under a reduced pressure of 0.3 mm., 7.5 g. of p-toluenesulfonic acid monohydrate and 50 ml. of acetone which previously had been distilled from potassium permanganate and potassium carbonate in that order, was stirred at room temperature for a period of 2 hours. The reaction mixture was then cooled to 3° C. and a solution of 200 ml. of 0.5 N sodium bicarbonate at 3° C. was added. The resulting solution was evaporated to dryness at 35° C. under reduced pressure. The residue thus obtained was extracted first with two 100-ml. portions of boiling chloroform and then with two 100-ml. portions of chloroform at room temperature. These extracts were filtered individually, then combined and evaporated. The thus-obtained residue was dissolved in 25 ml. of boiling water and the resulting solution was filtered. Refrigeration of the filtrate gave a crystalline precipitate of 2',3' - O - isopropylidenesparsomycin A weighing 0.75 g. (65%) and having a melting point of 170–173° C.

After two additional recrystallizations from water, 9-(2',3' - O - isopropylidene - β - D - ribofuranosyl) - 7-deazaadenine (2',3'-O-isopropylidenesparsomycin A) (2', 3'-isopropylidenetubercidin) of melting point 174–177° C. was obtained having the following analysis:

*Analysis.*—Calcd. for $C_{14}H_{18}N_4O_4$: C, 54.89; H, 5.92; N, 18.19; O, 20.92; CH₃C, 4.92. Found: C, 54.72; H, 5.92; N, 18.51; O, 21.2; CH₃C, 4.3.

E. N⁶,N⁶,5'-TRIBENZOYL-2',3'-O-ISOPROPYLIDENE-TUBERCIDIN

To a solution of 1.74 g. of 2'3'-O-isopropylidenetubercidin in 50 ml. of pyridine in an ice bath was added 4.35 g. of benzoyl chloride. The reaction mixture was stirred in an ice bath for 90 minutes and then poured into 150 ml. of ice and water. The mixture was then acidified with 2 N hydrochloric acid and filtered. The solid recovered by filtration was recrystallized from acetone-water to yield 3.28 g. of material which was again recrystallized from acetone-water to yield 2.78 g. of analytically pure $N^6,N^3,$ 5'-tribenzoyl-2',3' - O - isopropylidenetubercidin having a melting point of 131.5–133° C.

*Analysis.*—Calcd. for $C_{35}H_{31}N_4O_7$: C, 67.84; H, 5.04; N, 9.04. Found: C, 67.31; H, 5.04; N, 9.13.

To a partial solution of 0.5 g. of $N^6,N^6,$5'-tribenzoyl-2',3'-O-isopropylidenetubercidin in 50 ml. of a mixture of anhydrous tetrahydrofuran and anhydrous methanol (1:1 by volume) in an ice bath was added with stirring 0.2 ml. of 25% sodium methoxide in methanol. The mixture was removed from the ice bath and the reaction followed by thin layer chromatography on silica gel with 50% acetone–50% Skellysolve B hexanes. After 25 minutes at room temperature (about 25° C.) an additional 0.2 ml. of 25% sodium methoxide was added. After 64 minutes most of the starting material had disappeared. The reaction mixture was then cooled overnight (for about 17 hours) in a refrigerator between 0 and 5° C. and was then acidified to a pH between 5–6 with the aid of an acid exchange resin (Dowex 50–WX8). The solution was then concentrated under reduced pressure (40–45° C.) to yield a syrup which was chromatographed over 50 g. of silica gel with a mixture consisting of 25% acetone–75% Skellysolve B hexanes, taking fractions of 7 ml. each. Fractions 80–115 were combined and concentrated to give 210 mg. of $N^6$-benzoyl-2',3'-O-isopropylidenetubercidin having the following analysis:

*Analysis.*—Calcd. for $C_{21}H_{22}N_4O_5$: C, 61.30; H, 5.63; N, 13.62. Found: C, 61.05; H, 5.64; N, 13.43.

Recrystallized from ether-Skellysolve B hexanes, $N^6$-benzoyl-2',3'-O-isopropylidenetubercidin had a melting point of 106.5–109° C.

PREPARATION 2

*6-methylmercapto-9-(2',3'-O-isopropylidene-β-D-ribofuranosyl)-7-deazapurine*

A solution of 6 - mercapto - 9 - β - D-ribofuranosyl-7-deazaadenine (1 g.) in 8 ml. of 0.4 N sodium hydroxide was shaken at about 24° C. for a period of 10 minutes while 0.21 ml. of methyl iodide was added in portions. Another portion of 1.3 ml. of 0.4 N sodium hydroxide was added and the solution was shaken again with 0.21 ml. of methyl iodide. The reaction mixture was allowed to stand for 4 hours at room temperature and thereupon in a refrigerator overnight for 20 hours at about 0 to 5° C. The solids which separated were collected and filtered, dried over sodium hydroxide, refluxed for several minutes with 6 ml. of absolute methanol and chilled yielding white needles which were recovered by filtration. The white material was 6-methylmercapto-9-β-D-ribofuranosyl)-7-deazaadenine.

A mixture of 1 g. of 6-methylmercapto-9-β-D-ribofuranosyl-7-deazaadenine which had been dried overnight at 108° C. under a reduced pressure of 0.3 mm., 7.5 g. of p-toluenesulfonic acid monohydrate and 50 ml. of acetone which previously had been distilled from potassium permanganate and potassium carbonate in that order, was stirred at room temperature for a period of 2 hours. The reaction mixture was then cooled to 3° C. under reduced pressure. The residue thus obtained was extracted first with two 100-ml. portions of boiling chloroform and then with two 100-ml. portions of chloroform at room temperature. These extracts were filtered individually, then combined and evaporated. The thus-obtained residue was dissolved in 25 ml. of boiling water and the resulting solution was filtered. Refrigeration of the filtrate gave a crystalline precipitate of 6-methylmercapto - 9 - (2',3' - O - isopropylidene-β-D-ribofuranosyl)-7-deazapurine.

Substituting in Preparation 2 for methyl iodide another lower alkyl iodide, e.g., ethyl iodide, propyl iodide, isopropyl iodide, butyl iodide, isobutyl iodide and the like other 6-alkyl mercapto - 9-(2',3'-O-isopropylidene-β-D-ribofuranosyl)-7-deazapurine compounds are obtained, such as 6 - ethylmercapto-9-(2',3'-O-isopropylidene-β-D-ribofuranosyl)-7-deazapurine, 6 - propylmercapto - 9-(2', 3'-O-isopropylidene-β-D-ribofuranosyl) - 7 - deazapurine; 6-isopropylmercapto-9-(2',3'-O - isopropylidene-β-D-ribofuranosyl)-7-deazapurine; 6 - butylmercapto-9-(2',3'-O-isopropylidene-β-D-ribofuranosyl)-7-deazapurine; 6 - isobutylmercapto - 9 - (2',3' - O - isopropylidene-β-D-ribofuranosyl)-7-deazapurine, and the like.

In the same manner given in Preparation 1D, 9-β-D-ribofuranosyl-6-hydroxy-7-deazapurine (or in the keto from 7 - β - D - ribofuranosyl-7H-pyrrolo[2',3'-d]pyrimidone-4), 9-β-D-ribofuranosyl-6-mercapto-7-deazapurine, 9-β-D-ribofuranosyl-6-ethylmercapto-7-deazapurine, 9-β-D-ribofuranosyl-6-butylmercapto-7-deazapurine, 9 - β - D - ribofuranosyl-7-deazapurine [see J. E. Pike et al., Journal of Heterocyclic Chemistry I, 159 (1964)] are treated with a ketone, e.g. acetone, methyl ethyl ketone, diethyl ketone, dipropyl ketone, dibutyl ketone, cyclopentanone, cyclohexanone cycloheptanone, and the like in the presence of a benzenesulfonic acid, e.g., p-toluenesulfonic acid, to give the corresponding 2',3'-O-substituted derivative.

PREPARATION 3

*$N^6$-benzoyl-9-(2',3'-O-isopropylidene-β-D-ribofuranosyl)-7-deazaadenine 5'-phosphate*

A solution of 12 mmoles of freshly prepared cyanoethyl phosphate in 12.0 ml. of pyridine was dried by repeated concentration under reduced pressure at a bath temperature of 35°, introducing only dry air between additions. After the final concentration 2.05 g. (5.0 mmoles) of $N^6$ - benzoyl - 9-(2',3'-O-isopropylidene-β-D-ribofuranosyl)-7-deazaadenine was added, followed by 100 ml. of especially dried pyridine. The concentration was repeated as above and the residue dissolved in 40 ml. of the same pyridine. Dicyclohexylcarbodiimide (6.19 g., 30 mmoles) was added and the mixture was shaken in the dark at room temperature for 4 days. Water (4.0 ml.) was added and the mixture was shaken for an additional 30 minutes with 40 ml. of water, and filtered. The filtrate was concentrated under reduced pressure in a 35° bath to yield a syrup which was dissolved in 50 ml. of water and extracted with ether. The aqueous layer was then lyophilized. Upon dissolving the lyophilized solid in water, crystallization occurred. The crystals were collected on filter and dried in a vacuum desiccator over anhydrous calcium chloride yielding 1.43 g. of $N^6$-benzoyl-9-(2',3'-O-isopropylidene - β - D - ribofuranosyl) - 7-deazaadenine 5'-(2-cyanoethyl phosphate) M.P. 210–222°;

$$\lambda_{max.}^{EtOH} \ 303 \ m\mu \ (\epsilon \ 12{,}000)$$

A small sample (100 mg.) was recrystallized from 12 ml. methanol and 12 ml. water; M.P. 219–220° C.

*Analysis.*—Calcd. for $C_{24}H_{26}N_8O_8P$: C, 53.03; H, 4.82; N, 12.89; P, 5.70. Found: C, 53.01; H, 4.14; N, 12.47; P, 5.69.

To an ice-cold solution of 544 mg. (1 mmole) $N^6$-benzoyl - 9-(2',3'-O-isopropylidene-β-D-ribofuranosyl)-7-deazaadenine 5'-(2-cyanoethyl phosphate) [$N^6$-benzoylisopropylidenetubercidin 5'-(2-cyanoethyl phosphate)] in 5.5 ml. each of water and pyridine was added 11.0 ml. of 1.0 N sodium hydroxide. The solution was stirred in an ice-bath for 30 minutes and then adjusted to pH 6 with freshly prepared Dowex 50–WX8 (pyridinium form). The mixture was filtered, the resin washed with water, and the combined filtrates lyophilized to yield 500 mg. of $N^6$ - benzoyl - 9 - (2',3' - O - isopropylidene-β-D-ribofuranosyl)-7-deazaadenine 5'-phosphate.

PREPARATION 4

9-β-D-ribofuranosyl-6-methylmercapto-7-deazapurine 5'-phosphate

In the manner given in Preparation 3, 9-(2',3'-O-isopropylidene-β-D-ribofuranosyl)-6-methylmercapto-7-deazapurine was phosphorylated with 2-cyanoethyl phosphate in the presence of N,N'-dicyclohexylcarbodiimide. The resulting 2-cyanoethyl phosphate was treated with lithium hydroxide and the resulting product was treated with 1 N aqueous sulfuric acid and finally with barium hydroxide to give 9-β-D-ribofuranosyl-6-methylmercapto-7-deazapurine 5'-phosphate.

In the same manner given in Preparation 4, other 9-β-D-ribofuranosyl-6-alkylmercapto-7-deazapurine 5'-phosphates can be produced such as the 9-β-D-ribofuranosyl-6-ethyl-(6-propyl-, -isopropyl-, -butyl-, isobutyl-)mercapto-7-deazapurine 5'-phosphates.

In the manner given in Preparation 3, other 9-(2',3'-O-isopropylidene-β-D-ribofuranosyl)-7-deazapurine 5'-phosphates are prepared by reacting the selected 9-(2',3'-O-isopropylidene-β-D-ribofuranosyl)-7-deazapurine with 2-cyanoethyl phosphate in the presence of a condensing agent such as N,N'-dicyclohexylcarbodiimide and by decomposing with a base the obtained 9-(2',3'-O-isopropylidene-β-D-ribofuranosyl)-7-deazapurine 5'-(2-cyanoethyl)phosphate to obtain the corresponding 9-(2',3'-O-isopropylidene-β-D-ribofuranosyl)-7-deazapurine 5'-phosphate. Representative compounds thus obtained include: 9-(2',3'-O-isopropylidene-β-D-ribofuranosyl)-6-mercapto-7-deazapurine 5'-phosphate; 9-(2',3'-O-isopropylidene-β-D-ribofuranosyl)-6-hydroxy-7-deazapurine 5'-phosphate; 9-(2',3'-O-isopropylidene-β-D-ribofuranosyl)-7-deazapurine 5'-phosphate and the like.

In the manner given in Preparation 1E and 1F other $N^6$-acyl-9-(2',3'-O-isopropylidene-β-D-ribofuranosyl)-7-deazaadenines can be prepared by reacting 9-(2',3'-O-isopropylidene-β-D-ribofuranosyl)-7-deazaadenine with an acid chloride or acid anhydride and reacting the resulting material with a base, e.g., sodium or potassium methoxide or ethoxide. Representative compounds thus obtained include: $N^6$-acetyl-9-(2',3'-O-isopropylidene-β-D-ribofuranosyl)-7-deazaadenine; $N^6$-propionyl-9-(2',3'-O-isopropylidene-β-D-ribofuranosyl)-7-deazaadenine; $N^6$-butyryl-9-(2'3'-O-isopropylidene-β-D-ribofuranosyl)-7-deazaadenine; $N^6$-valeryl-9-(2',3'-O-isopropylidene-β-D-ribofuranosyl)-7-deazaadenine; $N^6$-hexanoyl-9-(2',3'-O-isopropylidene-β-D-ribofuranosyl)-7-deazaadenine); $N^6$-phenylacetyl-9-(2',3'-O-isopropylidene-β-D-ribofuranosyl)-7-deazaadenine; $N^6$-phenylpropionyl-9-(2',3'-O-isopropylidene-β-D-ribofuranosyl)-7-deazaadenine; $N^6$-decanoyl-9-(2',3'-O-isopropylidene-β-D-ribofuranosyl)-7-deazaadenine; $N^6$-lauroyl-9-(2',3'-O-isopropylidene-β-D-ribofuranosyl)-7-deazaadenine; $N^6$-anisoyl-9-(2',3'-O-isopropylidene-β-D-ribofuranosyl)-7-deazaadenine; $N^6$-(β-cyclopentylpropionyl)-9-(2',3'-O-isopropylidene-β-D-ribofuranosyl)-7-deazaadenine, and the like, which likewise are in Preparation 3 are converted to the corresponding phosphate, such as $N^6$-acetyl-9-(2',3'-O-isopropylidene-β-D-ribofuranosyl)-7-deazaadenine 5'-phosphate; $N^6$-propionyl-9-(2',3'-O-isopropylidene-β-D-ribofuranosyl)-7-deazaadenine 5'-phosphate; $N^6$-butyryl-9-(2',3'-O-isopropylidene-β-D-ribofuranosyl)-7-deazaadenine 5'-phosphate; $N^6$-valeryl-9-(2',3'-O-isopropylidene-β-D-ribofuranosyl)-7-deazaadenine 5'-phosphate; $N^6$-hexanoyl-9-(2',3'-O-isopropylidene-β-D-ribofuranosyl)-7-deazaadenine 5'-phosphate; $N^6$-phenylacetyl-9-(2',3'-O-isopropylidene-β-D-ribofuranosyl)-7-deazaadenine 5'-phosphate; $N^6$-phenylpropionyl-9-(2',3'-O-isopropylidene-β-D-ribofuranosyl)-7-deazaadenine 5'-phosphate; $N^6$-decanoyl-9-(2',3'-O-isopropylidene-β-D-ribofuranosyl)-7-deazaadenine 5'-phosphate; $N^6$-lauroyl-9-(2',3'-O-isopropylidene-β-D-ribofuranosyl)-7-deazaadenine 5'-phosphate; $N^6$-anisoyl-9-(2',3'-O-isopropylidene-β-D-ribofuranosyl)-7-deazaadenine 5'-phosphate; $N^6$-cyclopentylpropionyl-9-(2',3'-O-isopropylidene-β-D-ribofuranosyl)-7-deazaadenine 5'-phosphate and the like.

EXAMPLE 1

Methyl $N^6$-benzoyl-9-(2',3'-O-isopropylidene-β-D-ribofuranosyl)-7-deazaadenine 5'-phosphate A solution of 0.5 mmole of $N^6$-benzoyl-9-(2',3'-O-isopropylidene-β-D-ribofuranosyl)-7-deazaadenine 5'-phosphate and 12 ml. of anhydrous pyridine [purified according to Jacob and Khorana, J. Am. Chem. Soc., 86, 1630 (1963)] was dried by distillation of the pyridine under reduced pressure. Pyridine was added and the solution again was concentrated to dryness under reduced pressure. This was repeated twice more and thereupon the resultant product was dissolved in 10 ml. of the same pyridine under anhydrous conditions and to this solution was added 2.6 ml. of tri-n-butyl amine, 20 ml. of anhydrous methanol and 7 g. of dicyclohexylcarbodiimide. The mixture was stirred at room temperature (24 to 26° C.) in the dark for 41 hours and then concentrated to a small volume under reduced pressure. To this small volume were added 2 volumes of ether and the ether layer decanted. More ether was added and the mixture was filtered. The solids collected on filter were mixed with 25 ml. of water and this mixture was stirred for 2 hours. The mixture was then filtered and the filtrate allowed to stand for a period of 3 hours and again filtered. The thus-obtained solution showed 3400 optical density units (O.D.U.) at 302 mμ. The ε of the starting material was 9200, therefore 74% of esterification was achieved. The aqueous layer was then concentrated to dryness to give $N^6$-benzoyl-9-(2',3'-O-isopropylidene-β-D-ribofuranosyl)-7-deazaadenine 5'-methylphosphate.

EXAMPLE 2

Methyl 9-β-D-ribofuranosyl-7-deazaadenine 5'-phosphate (methylester of Sparsomycin A 5'-phosphate)

Methylester of $N^6$-benzoyl-9-(2',3'-O-isopropylidene-β-D-ribofuranosyl)-7-deazaadenine 5'-phosphate (obtained in Example 1) was introduced in a mixture of 10 ml. of methanol containing 10 ml. of concentrated ammonium hydroxide. The mixture was allowed to stand at room temperature for 22 hours. The solution was then concentrated to dryness and the solids, thus obtained dissolved in 80% acetic acid. The solution was kept at room temperature for 41 hours and then heated on the steam bath for 40 to 45 minutes. The solution was concentrated to dryness and the residue taken up in a small volume of a solvent consisting of isopropionyl, concentrated ammonium hydroxide and water in a ratio of 7:1:2 and chromatographed (4 ml. fractions) on 35 g. of silica gel, previously charged with the same solvent mixture. Fractions 22–30 were combined and the ultraviolet spectrum determined; total O.D.U.=1938 at 269 mμ. The fractions 22–30 were concentrated and finally lyophilized to give methyl 9-β-D-ribofuranosyl-7-deazaadenine 5'-phosphate as a white solid, $R_f$=0.50.

EXAMPLE 3

Ethyl ester of 9-(2',3'-O-isopropylidene-β-D-ribofuranosyl)-7-deazapurine 5'-phosphate In the manner given in Example 1, 9-(2',3'-O-isopropylidene-β-D-ribofuranosyl)-7-deazapurine 5'-phosphate in pyridine solution was reacted under anhydrous conditions with triethylamine, ethanol, and dicylcohexyl carbodiimide to give the ethyl ester of 9-(2',3'-O-isopropylidene-β-D-ribofuranosyl)-7-deazapurine 5'-phosphate.

EXAMPLE 4

Ethyl ester of 9-β-D-ribofuranosyl-7-deazapurine 5'-phosphate

The ethyl ester of 9-(2',3'-O-isopropylidene-β-D-ribofuranosyl)-7-deazapurine 5'-phosphate obtained as in Example 3 was hydrolyzed with 80% aqueous acetic acid like in Example 2 to give the ethyl ester of 9-β-D-ribofuranosyl-7-deazapurine 5'-phosphate.

EXAMPLE 5

Butyl ester of 9-(2',3'-O-isopropylidene-β-D-ribofuranosyl)-7-deazapurine 5'-phosphate In the manner given in Example 1, 9-(2',3'-O-isopropylidene-β-D-ribofuranosyl)-7-deazapurine 5'-phosphate in pyridine solution was reacted under anhydrous conditions with triethylamine, butanol and dicyclohexyl carbodiimide to give the butyl ester of 9-(2',3'-O-isopropylidene-β-D-ribofuranosyl)-7-deazapurine 5'-phosphate.

EXAMPLE 6

Butyl ester of 9-β-D-ribofuranosyl-7-deazapurine 5'-phosphate

The butyl ester of 9-(2',3'-O-isopropylidene-β-D-ribofuranosyl)-7-deazapurine 5'-phosphate, obtained as in Example 5, was hydrolyzed with 80% aqueous acetic acid like in Example 2, to give the butyl ester of 9-β-D-ribofuranosyl-7-deazapurine 5'-phosphate.

EXAMPLE 7

Hexyl ester of 9-(2',3'-O-isopropylidene-β-D-ribofuranosyl)-7-deazapurine 5'-phosphate In the manner given in Example 1, 9-(2',3'-O-isopropylidene-β-D-ribofuranosyl)-7-deazapurine 5' - phosphate in pyridine solution was reacted under anhydrous conditions with triethylamine, hexanol and dicyclohexylcarbodiimide to give the hexyl ester of 9-(2',3'-O-isopropylidene-β-D-ribofuranosyl)-7-deazapurine 5' - phosphate.

EXAMPLE 8

Hexyl ester of 9-β-D-ribofuranosyl-7-deazapurine 5'-phosphate

The hexyl ester of 9-(2',3'-O-isopropylidene-β-D-ribofuranosyl)-7-deazapurine 5'-phosphate, obtained as in Example 7, was hydrolyzed with 80% aqueous acetic acid like in Example 2 to give the hexyl ester of 9-β-D-ribofuranosyl-7-deazapurine 5'-phosphate.

EXAMPLE 9

Dodecyl ester of 9-(2',3'-O-isopropylidene-β-D-ribofuranosyl)-7-deazapurine 5'-phosphate In the manner given in Example 1, 9-(2',3'-O-isopropylidene-β-D-ribofuranosyl)-7-deazapurine 5'-phosphate in pyridine solution was reacted under anhydrous conditions with triethylamine, dodecanol and dicyclohexylcarbodiimide to give the dodecyl ester of 9-(2',3'-O-isopropylidene-β-D-ribofuranosyl)-7-deazapurine 5'-phosphate.

EXAMPLE 10

Dodecyl ester of 9-β-D-ribofuranosyl-7-deazapurine 5'-phosphate

The dodecyl ester of 9-(2',3'-O-isopropylidene-β-D-ribofuranosyl)-7-deazapurine 5'-phosphate, obtained as in Example 9, was hydrolyzed with 80% aqueous acetic acid like in Example 2 to give the dodecyl ester of 9-β-D-ribofuranosyl-7-deazapurine 5'-phosphate.

EXAMPLE 11

Methyl ester of 9-(2',3'-O-isopropylidene-β-D-ribofuranosyl)-6-mercapto-7-deazapurine 5'-phosphate In the manner given in Example 1, 9-(2',3'-O-isopropylidene-β-D-ribofuranosyl)-6-mercapto - 7 - deazapurine 5'-phosphate in pyridine solution was reacted under anhydrous conditions with triethylamine, methanol and dicyclohexylcarbodiimide to give the methyl ester of 9-(2',3' - O - isopropylidene - β - D - ribofuranosyl)-6-mercapto-7-deazapurine 5'-phosphate.

EXAMPLE 12

Methyl ester of 9-β-D-ribofuranosyl-6-mercapto-7-deazapurine 5'-phosphate

The methyl ester of 9-(2',3'-O-isopropylidene-β-D-ribofuranosyl) - 6 - mercapto - 7 - deazapurine 5'-phosphate, obtained as in Example 11, was hydrolyzed with 80% aqueous acetic acid like in Example 2, to give the methyl ester of 9-β-D-ribofuranosyl-6-mercapto-7-deazapurine 5'-phosphate.

EXAMPLE 13

Propyl ester of 9-(2',3'-O-isopropylidene-β-D-ribofuranosyl)-6-methylmercapto-7-deazapurine 5'-phosphate In the manner given in Example 1, 9-(2',3'-O-isopropylidene - β - D - ribofuranosyl)-6-methylmercapto-7-deazapurine 5'-phosphate in pyridine solution was reacted under anhydrous conditions with triethylamine, propanol and dicyclohexylcarbodiimide to give the propyl ester of 9 - (2',3' - O - isopropylidene - β - D - ribofuranosyl)-6-methylmercapto-7-deazapurine 5'-phosphate.

EXAMPLE 14

Propyl ester of 9-β-D-ribofuranosyl-6-methylmercapto-7-deazapurine 5'-phosphate

The propyl ester of 9 - (2',3'-O-isopropylidene-β-D-ribofuranosyl) - 6 - methylmercapto - 7 - deazapurine 5'-phosphate obtained as in Example 13, was hydrolyzed with 80% aqueous acetic acid like in Example 2, to give the propyl ester of 9-β-D-ribofuranosyl-6-methylmercapto-7-deazapurine 5'-phosphate.

EXAMPLE 15

Pentyl ester of 9-(2',3'-O-isopropylidene-β-D-ribofuranosyl)-6-ethylmercapto-7-deazapurine 5'-phosphate In the manner given in Example 1, 9-(2',3'-O-isopropylidene - β - D - ribofuranosyl)-6-ethylmercapto-7-deazapurine 5'-phosphate in pyridine solution was reacted under anhydrous conditions with triethylamine, pentanol and dicyclohexylcarbodiimide to give the pentyl ester of 9 - (2',3' - O - isopropylidene - β - D - ribofuranosyl)-6-ethylmercapto-7-deazapurine 5'-phosphate.

EXAMPLE 16

Pentyl ester of 9-β-D-ribofuranosyl-6-ethylmercapto-7-deazapurine 5'-phosphate

The pentyl ester of 9-(2',3'-O-isopropylidene-β-D-ribofuranosyl) - 6 - ethylmercapto - 7 - deazapurine 5'-phosphate, obtained as in Example 15, was hydrolyzed with 80% aqueous acetic acid like in Example 2, to give the pentyl ester of 9-β-D-ribofuranosyl-6-ethylmercapto-7-deazapurine 5'-phosphate.

EXAMPLE 17

Phenyl ester of 9-(2',3'-O-isopropylidene-β-D-ribofuranosyl)-7-deazapurine 5'-phosphate In the manner given in Example 1, 9-(2',3'-O-isopropoylidene-β-D-ribofuranosyl) - 7 - deazapurine 5-phosphate in pyridine solution was reacted under anhydrous conditions with triethylamine, phenol and dicyclohexylcarbodiimide to give the phenyl ester of 9-(2',3'-O-isopropylidene - β - D - ribofuranosyl)-7-deazapurine 5'-phosphate.

EXAMPLE 18

Phenyl ester of 9-β-D-ribofuranosyl-7-deazapurine 5'-phosphate

The phenyl ester of 9-(2',3'-O-isopropylidene-β-D-ribofuranosyl)-7-deazapurine 5'-phosphate, obtained as in Example 17, was hydrolyzed with 80% acetic acid like in Example 2, to give the phenyl ester of 9-β-D-ribofuranosyl-7-deazapurine 5'-phosphate.

EXAMPLE 19

*Methyl ester of 9-(2′,3′-O-isopropylidene-β-D-ribofuranosyl)-6-hydroxy-7-deazapurine 5′-phosphate*

In the manner given in Example 1, 9-(2′,3′-O-isopropylidene-β-D-ribofuranosyl) - 6 - hydroxy-7-deazapurine 5′-phosphate in pyridine solution was reacted under anhydrous conditions with triethylamine, methanol and dicyclohexylcarbodiimide to give the methyl ester of 9-(2′,3′-O-isopropylidene - β - D - ribofuranosyl) - 6-hydroxy-7-deazapurine 5′-phosphate.

EXAMPLE 20

*Methyl ester of 9-β-D-ribofuranosyl-6-hydroxy-7-deazapurine 5′-phosphate*

The methyl ester of 9-(2′-,3′-O-isopropylidene-β-D-ribofuranosyl) - 6 - hydroxy-7-deazapurine 5′-phosphate, obtained as in Example 19, was hydrolyzed with 80% aqueous acetic acid, like in Example 2, to give the methyl ester of 9 - β - D - ribofuranosyl-6-hydroxy-7-deazapurine 5′-phosphate.

EXAMPLE 21

*Cyclopentyl ester of 9-(2′,3′-O-isopropylidene-β-D-ribofuranosyl)-7-deazapurine 5′-phosphate*

In the manner given in Example 1, 9-(2′,3′-O-isopropylidene-β-D-ribofuranosyl) - 7-deazapurine 5′-phosphate in pyridine solution was reacted under anhydrous conditions with triethylamine, cyclopentanol and dicyclohexylcarbodiimide to give the cyclopentyl ester of 9-(2′,3′-O-isopropylidene - β - D-ribofuranosyl) - 7 - deazapurine 5′-phosphate.

EXAMPLE 22

*Cyclopentyl ester of 9-β-D-ribofuranosyl-7-deazapurine 5′-phosphate*

The cyclopentyl ester of 9-(2′,3′-O-isopropylidene-β-D-ribofuranosyl)-7-deazapurine 5′-phosphate, obtained as in Example 21, was hydrolyzed with 80% aqueous acetic acid like in Example 2, to give the cyclopentyl ester of 9-β-D-ribofuranosyl-7-deazapurine 5′-phosphate.

EXAMPLE 23

*Cyclohexyl ester of 9-(2′,3′-O-isopropylidene-β-D-ribofuranosyl)-7-deazapurine 5′-phosphate*

In the manner given in Example 1, 9-(2′,3′-O-isopropylidene-β-D-ribofuranosyl)-7-deazapurine 5′-phosphate in pyridine solution was reacted under anhydrous conditions with triethylamine, cyclohexanol and dicyclohexylcarbodiimide to give the cyclohexyl ester of 9-(2′,3′-O-isopropylidene-β-D-ribofuranosyl-7-deazapurine 5′-phosphate.

EXAMPLE 24

*Cyclohexyl ester of 9-β-D-ribofuranosyl-7-deazapurine 5′-phosphate*

The cyclohexyl ester of 9-(2′,3′-O-isopropylidene-β-D-ribofuranosyl)-7-deazapurine 5′-phosphate, obtained as in Example 23, was hydrolyzed with 80% aqueous acetic acid like in Example 2, to give the cyclohexyl ester of 9-β-D-ribofuranosyl-7-deazapurine 5′-phosphate.

EXAMPLE 25

*Ethyl ester of $N^6$-lauroyl-9-(2′,3′-O-isopropylidene-β-D-ribofuranosyl)-7-deazaadenine 5′-phosphate*

In the manner given in Example 1, $N^6$-lauroyl-9-(2′,3′-O-isopropyldiene-β-D-ribofuranosyl)-7 - deazaadenine 5′-phosphate in pyridine solution was reacted under anhydrous conditions with tributylamine, ethanol and dicyclohexylcarbodiimide to give the ethyl ester of $N^6$-lauroyl-9-(2′,3′-O-isopropylidene-β-D-ribofuranosyl) - 7 - deazaadenine 5′-phosphate.

EXAMPLE 26

*Ethyl ester of 9-β-D-ribofuranosyl-7-deazaadenine 5′-phosphate*

In the manner given in Example 2, the ethyl ester of $N^6$-lauroyl - 9-(2′,3′-O-isopropylidene - β - D - ribofuranosyl)-7-deazapurine 5′-phosphate, obtained as in Example 25, was hydrolyzed first with concentrated ammonium hydroxide in methanol and then with 80% aqueous acetic acid to give the ethyl ester of 9-β-D-ribofuranosyl-7-deazaadenine 5′-phosphate.

EXAMPLE 27

*2,4-dinitrophenylester of $N^6$-acetyl-9-(2′,3′-O-isopropylidene-β-D-ribofuranosyl)-7-deazaadenine 5′-phosphate*

In the manner given in Example 1, $N^6$-acetyl-9-(2′,3′-O-isopropylidene-β-D-ribofuranosyl) - 7-deazaadenine 5′-phosphate in pyridine solution was reacted under anhydrous conditions with tributylamine, 2,4-dinitrophenol and dicyclohexylcarbodiimide to give the 2,4-dinitrophenyl ester of $N^6$-acetyl - 9 - (2′,3′-O-isopropylidene-β-D-ribofuranosyl)-7-deazaadenine 5′-phosphate.

EXAMPLE 28

*2,4-dinitrophenylester of 9-β-D-ribofuranosyl-7-deazaadenine 5′-phosphate*

In the manner given in Example 2, the 2,4-dinitrophenyl ester of $N^6$-acetyl-9-(2′,3′-O-isopropylidene - β - D - ribofuranosyl)-7-deazaadenine 5′-phosphate, obtained as in Example 27, was hydrolyzed first with concentrated ammonium hydroxide in methanol and then with 80% aqueous acetic acid to give the 2,4-dinitrophenyl ester of 9-β-D-ribofuranosyl-7-deazaadenine-5′-phosphate.

EXAMPLE 29

*2-naphthyl ester of $N^6$-acetyl-9-(2′,3′-O-isopropylidene-β-D-ribofuranosyl)-7-deazaadenine 5′-phosphate*

In the manner given in Example 1, $N^6$-acetyl-9-(2′,3′-O-isopropylidene - β - D - ribofuranosyl)-7-deazaadenine 5′-phosphate in pyridine solution was reacted under anhydrous conditions with tributylamine, 2-naphthol and dicyclohexylcarbodiimide to give the 2-naphthyl ester of $N^6$-acetyl - 9-(2′,3′-O-isopropylidene - β - D - ribofuranosyl)-7-deazaadenine 5′-phosphate.

EXAMPLE 30

*2-naphthyl ester of 9-β-D-ribofuranosyl-7-deazaadenine 5′-phosphate*

In the manner given in Example 2, the 2-naphthyl ester of $N^6$ - acetyl - 9 - (2′,3′-O-isopropylidene-β-D-ribofuranosyl)-7-deazaadenine 5′-phosphate, obtained as in Example 29, was hydrolyzed first with concentrated ammonium hydroxide in methanol and then with 80% aqueous acetic acid to give the 2-naphthyl ester of 9-β-D-ribofuranosyl-7-deazaadenine 5′-phosphate.

EXAMPLE 31

*Methyl ester of $N^6$-benzoyl-9-β-D-ribofuranosyl-7-deazaadenine 5′-phosphate*

The methyl ester of $N^6$-benzoyl-9-(2′,3′-O-isopropylidene-β-D-ribofuranosyl)-7-deazaadenine 5′-phophate, obtained as in Example 1, was hydrolyzed with 80% aqueous acetic acid, like in Example 2, to give the methyl ester of $N^6$-benzoyl-9-β-D-ribofuranosyl-7-deazaadenine 5′-phosphate.

In the manner given in the preceding examples other alkyl and aryl esters of 9-β-D-ribofuranosyl-7-deazapurine 5′-phosphates can be obtained, by reacting a selected 9-(2′,3′-O-isopropylidene-β-D-ribofuranosyl) - 7-deazapurine 5′-phosphate with a selected alkanol or phenol in the presence of a lower trialkylamine and a condensing agent, e.g., dicyclohexylcarbodiimide, to give the corresponding 2′,3′-isopropylidene nucleoside alkyl (or aryl) ester and hydrolyzing this ester with an acid to obtain the corresponding nucleoside alkyl or aryl 5'-phosphate ester. If in addition acyl groups attached to amides are to be removed, a base hydrolysis, e.g. with ammonium hydroxide in methanol, is necessary. Representative compounds thus obtained include: the 4-nitronaphthyl ester of 9-β-D-ribofuranosyl-7-deazapurine 5'-phosphate; the decyl ester of 9-β-D-ribofuranosyl-6-hydroxy-7-deazapurine 5'-phosphate; the octyl ester of 9-β-D-ribofuransoyl-6-mercapto-7-deazapurine 5'-phosphate; the hexyl ester of 9-β-D-ribofuranosyl - 6-butylmercapto-7-deazapurine 5'-phosphate; the butyl ester of 9-β-D-ribofuranosyl-6-hydroxy-7-deazapurine 5'-phosphate; the p-nitrophenyl ester of N⁶-acetyl-9-β-D-ribofuranosyl-7-deazaadenine 5'-phosphate; the 1-naphthyl ester of N⁶-phenylacetyl-9-β-D-ribofuranosyl-7-deazaadenine 5'-phosphate; the p-tolyl ester of 9-β-D-ribofuranosyl-6-propylmercapto-7-deazapurine 5' - phosphate; the 8-methylnaphthyl ester of N⁶-lauroyl-β-D-ribofuranosyl-7-deazaadenine 5'-phosphate; the 5,8-dimethylnaphthyl ester of 9-β-D-ribofuranosyl-7-deazapurine 5'-phosphate; the cyclodecyl ester of N⁶-anisoyl-9-β-D-ribofuranosyl-7-deazaadenine 5'-phosphate and the like.

We claim:
1. A compound selected from alkyl, cycloalkyl and aryl esters of a 9-β-D-ribofuranosyl-7-deazapurine 5'-phospshate having the formula:

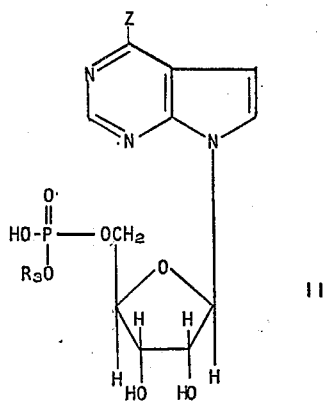

wherein Z is selected from the group consisting of hydrogen, hydroxy, amino, acylamino, in which the acyl group is of a hydrocarbon carboxylic acid containing from 2 to 12 carbon atoms, inclusive, and anisoyl, thio and alkylthio in which the alkyl group has from 1 to 4 carbon atoms, inclusive, and wherein $R_3$ is selected from the group consisting of alkyl radicals having from 1 to 12 carbon atoms, cycloalkyl radicals having from 5 to 10 carbon atoms and aryl having from 6 to 12 carbon atoms, inclusive.

2. The methyl ester of 9-β-D-ribofuranosyl-7-deazaadenine 5'-phosphate.

3. The methyl ester of N⁶-benzoyl-9-β-D-ribofuranosyl-7-deazaadenine 5'-phosphate.

4. The ethyl ester of 9-β-D-ribofuranosyl-7-deazapurine 5'-phosphate.

5. The methyl ester of 9-β-D-ribofuranosyl-6-mercapto-7-deazapurine 5'-phosphate.

6. A compound selected from alkyl, cycloalkyl and aryl esters of a 9-(2',3'-substituted-β-D-ribofuranosyl)-7-deazapurine 5'-phosphate of the formula:

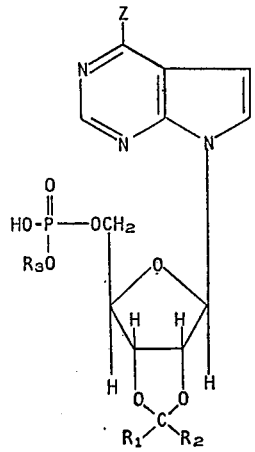

wherein $R_1$ and $R_2$ are alkyl radicals having from 1 to 4 carbon atoms, inclusive or together can form an alkylene chain of 4 to 6 carbon atoms, inclusive, wherein Z is selected from the group consisting of hydrogen, hydroxy, amino, acylamino, in which the acyl group is of a hydrocarbon carboxylic acid containing from 2 to 12 carbon atoms, inclusive, and anisoyl, thio and alkylthio in which the alkyl group has from 1 to 4 carbon atoms, inclusive, and wherein $R_3$ is selected from the group consisting of alkyl radicals having from 1 to 12 carbon atoms, cycloalkyl radicals having from 5 to 10 carbon atoms and aryl having from 6 to 12 carbon atoms, inclusive.

7. The methyl ester of N⁶-benzoyl-9-(2',3',O-isopropylidene-β-D-ribofuranosyl)-7-deazaadenine 5'-phosphate.

8. Ethyl ester of 9-(2',3'-O-isopropylidene-β-D-ribofuranosyl)-7-deazapurine 5'-phosphate.

9. Methyl ester of 9-(2',3'-O-isopropylidene-β-D-ribofuranosyl)-6-mercapto-7-deazapurine 5'-phosphate.

References Cited
UNITED STATES PATENTS

| | | | |
|---|---|---|---|
| 3,170,835 | 2/1965 | Godfrey | 260—978 |
| 3,284,440 | 11/1966 | Patchett et al. | 260—211.5 |
| 3,300,479 | 1/1967 | Hanze | 260—211.5 |

OTHER REFERENCES

Khorana: "Some Recent Developments in the Chemistry of Phosphate Esters of Biological Interest," 1961, pp. 75, 76, 99, 100 and 106, John Wiley and Sons, Inc., New York, N.Y.

LEWIS GOTTS, *Primary Examiner.*

J. R. BROWN, *Assistant Examiner.*